US008515717B2

(12) United States Patent
Do et al.

(10) Patent No.: US 8,515,717 B2
(45) Date of Patent: Aug. 20, 2013

(54) METHOD TO SIMULATE VEHICLE HORN SOUND PRESSURE LEVEL

(75) Inventors: Truc M. Do, Columbus, OH (US); Victor Daniel Flores, Dublin, OH (US); Jared S. Cox, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 12/857,134

(22) Filed: Aug. 16, 2010

(65) Prior Publication Data

US 2012/0039479 A1 Feb. 16, 2012

(51) Int. Cl.
*G06G 7/48* (2006.01)
*G06G 7/64* (2006.01)
*G06G 7/70* (2006.01)
*G06F 17/10* (2006.01)

(52) U.S. Cl.
USPC .................................................... 703/6; 703/2

(58) Field of Classification Search
None
See application file for complete search history.

(56) References Cited

U.S. PATENT DOCUMENTS 5,568,404 A 10/1996 Strumolo
5,940,788 A 8/1999 Morman et al.
6,917,907 B2 7/2005 Hsi et al.
6,985,836 B2 1/2006 Cremers et al.
7,191,022 B1 3/2007 Kakuhari et al.
2002/0035456 A1 * 3/2002 Cremers et al. .................... 703/5
2007/0208443 A1 9/2007 Caprioli
2009/0119080 A1 5/2009 Gray et al.

OTHER PUBLICATIONS

Lemaitre et al. "Model and estimation method for predicting the sound radiated by a horn loudseaker—with application to a car horn", 2008, Applied Acoustics 69, pp. 47-59.*

Martinus et al "Practical Considerations in REconstructig the Surface Vibration using Inverse Numerical Acoustics", 2003, Societ of Automotive Engineers, 03NVC-113, 9 pages.*

Gunness et al., "Loudspeaker Acoustic Field Calculations with Application to Directional Response Measurement", 2000, AES 109$^{th}$ Convention, 12 pages.*

Citarella et al. "Modal acoustic transfer vector approach in a FEM-BEM vibro-accoustic analysis", 2007, Engineering Analysis with Boundary Elements 31, pp. 248-258.*

Savoija, L. "Modeling Techniques for Virtual Acoustics", 1999, 69 pages.*

Kirkup, Stephan, "The Boundary Element Method in Aooustics", 1998, 142 pages, available online at <http://www.boundary-element-method.com>.

Kirkup and Thompson, "Simulation of the Acoustic Field Produced in Cavitites using the Boundary Element—Rayleigh Integral Method (BERIM) and its Application to a Horn Loudspeaker", *International Congress of Sound and Vibration*, 2004, 8 pages.

Kirkup and Thompson, "Computing the Acoustic Field of a Radiating Cavity by the Boundary Element—Rayleigh Integral Method (VERIM) with Application to a Horn Loudspeaker", *Academic Report AR-07-03*, East Lancashire Institute of Higher Education at Blackburn College, Jul. 2007

* cited by examiner

*Primary Examiner* — Suzanne Lo
(74) *Attorney, Agent, or Firm* — Fay Sharpe LLP

(57) ABSTRACT

Methods and system for predicting sound pressure and/or sound pressure level caused by a vehicle horn are provided. An acoustic model of the horn is generated through the use of inverse numerical acoustics and boundary element methods. Additionally, an acoustic model of the vehicle is generated using boundary element methods. By combining these acoustic models and using the acoustic model of the horn as input into the acoustic model of the vehicle, sound pressure and/or sound pressure level at points within the acoustic domain encompassing the acoustic models can be predicted using boundary elements methods.

19 Claims, 10 Drawing Sheets

METHOD TO SIMULATE VEHICLE HORN SOUND PRESSURE LEVEL

BACKGROUND

The present disclosure relates generally to acoustic modeling and simulation. It finds particular relevance to the simulation of vehicle horn sound pressure level (SPL) for purposes of meeting horn SPL regulations, and will be described with particular reference thereto. However, it is to be appreciated that the present exemplary embodiments are also amenable to other similar applications.

Horn sound pressure level (SPL) is a regulation that car manufactures must comply with before vehicles can be sold in certain markets, such as the United States and the European Union. For example, horn SPL must exceed 93 dBA at seven meters from the vehicle to meet SPL regulations in the EU. One technical challenge to meeting horn SPL regulations is generating a suitable horn layout (i.e., the placement of the horn within a vehicle).

Traditionally, horn layouts have been created based upon experience and design guides. That is to say, a horn has traditionally been placed within a vehicle on the basis of skill and intuition. Under such an approach, horn SPL generally cannot be measured until a prototype of the vehicle is built. Thereafter, once the prototype is built, the prototype is used to test horn layouts on a regulation test setup, such as the regulation test setup illustrated in FIG. 1. As can be seen in FIG. 1, SPL is being measured at 7 meters and 15 meters from the vehicle.

Following the traditional approach, however, it is feasible that a horn layout does not meet horn SPL regulation requirements as late as the initiation of mass production. Naturally, failing to meet regulatory requirements may lead to a costly redesign of the horn layout. Consequently, there exists a need for improved systems and/or methods for meeting horn SPL regulations.

INCORPORATION BY REFERENCE

The disclosures of U.S. Pat. No. 6,985,836 for "Computer Aided Engineering Method And Apparatus For Predicting A Quantitative Value Of A Physical Property At A Point From Waves Generated By Or Scattered From A Body," by Cremers et al., filed Jul. 3, 2001; and Stephen M. Kirkup, The Boundary Element Method in Acoustics (1998) are each hereby incorporated herein in their entireties.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to an aspect of the present disclosure, a method is provided for predicting a sound pressure level caused by a horn disposed within a vehicle. The method includes generating an acoustic model of the horn using inverse numerical acoustics and boundary element methods and generating an acoustic model of the vehicle using boundary element methods. The acoustic models are then combined into a complete acoustic model, which is used to predict sound pressure level at one or more points relative to the vehicle.

According to another aspect of the present disclosure, a method is provided for determining whether a horn layout of a horn within a vehicle meets sound pressure level regulations. The method includes generating an acoustic model of the horn using inverse numerical acoustics and boundary element methods and generating an acoustic model of the vehicle using boundary element methods. The acoustic models are then combined into a complete acoustic model and the complete acoustic model is used to predict sound pressure level at one or more specified points. These predictions are then compared to sound pressure level regulations.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
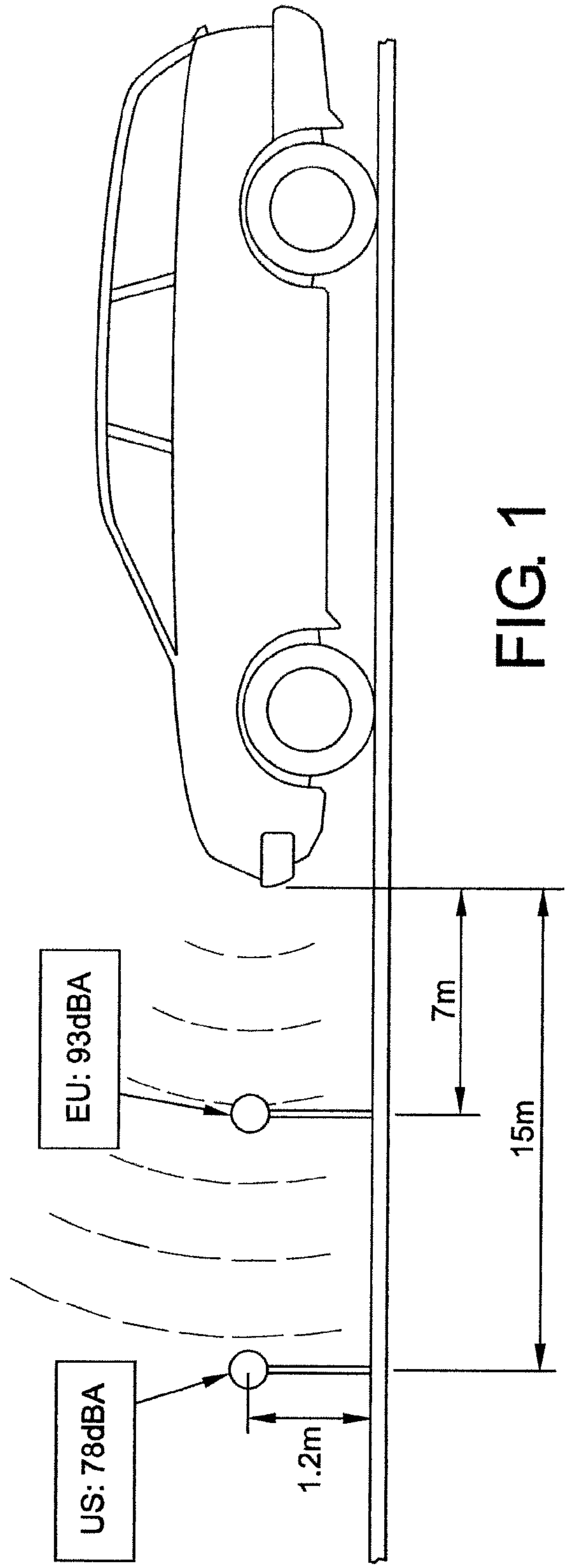
FIG. 1 (PRIOR ART)
FIG. 1 illustrates a regulation test setup for meeting horn SPL regulations.

One or more embodiments or implementations are hereinafter described in conjunction with the drawings, where like reference numerals are used to refer to like elements throughout, and where the various features are not necessarily drawn to scale.

The present exemplary embodiments relate generally to acoustic modeling and simulation. Through the use of inverse numerical acoustics and boundary element methods, acoustic models of a horn and a vehicle are generated and used to predict sound pressure level at points within the acoustic domain encompassing the acoustic models. Advantageously, this allows a horn layout to be selected that meets horn SPL regulations without having to undergo an iterative trial and error process on prototype vehicles.

Figure 2:
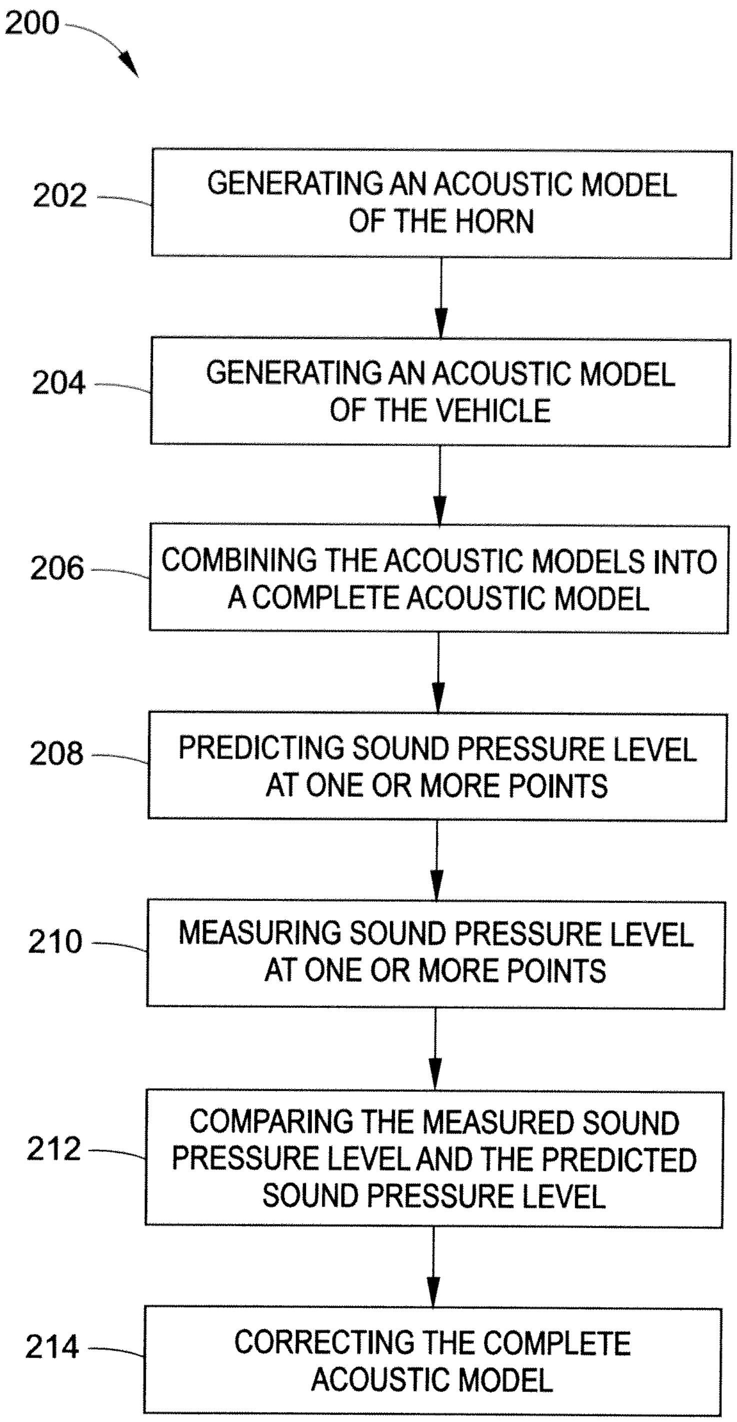
FIG. 2 illustrates a method for predicting sound press level caused by a vehicle horn.

With reference to FIG. 2, a method 200 for predicting a sound pressure level caused by a vehicle horn is illustrated. The method 200 includes generating an acoustic model of the horn (Action 202), generating an acoustic model of the vehicle (Action 204), combining the acoustic model of the horn and the acoustic model of the vehicle into a complete acoustic model (Action 206), and predicting sound pressure level at one or more points relative to the vehicle using the complete acoustic model (Action 208). Optionally, the method may further include measuring sound pressure level at the one or more points (Action 210), comparing the predicted sound pressure level with the measured sound pressure level (Action 212), and correcting the complete acoustic model if a difference between the measured sound pressure level and the predicted sound pressure level exceeds a threshold (Action 214).

Referring more particularly to Action 202, the basic approach to generating an acoustic mode of the horn is to determine the normal velocities on the surface of the horn and use the normal velocities as boundary conditions for boundary element methods. As will be appreciated, there are numerous ways to determine the normal velocities on the surface of the horn, all of which are amenable to the teachings herein. According to one suitable method, the normal velocities are determined using inverse numerical acoustics, as discussed in U.S. Pat. No. 6,985,836 to Cremers et al.

Figure 3:
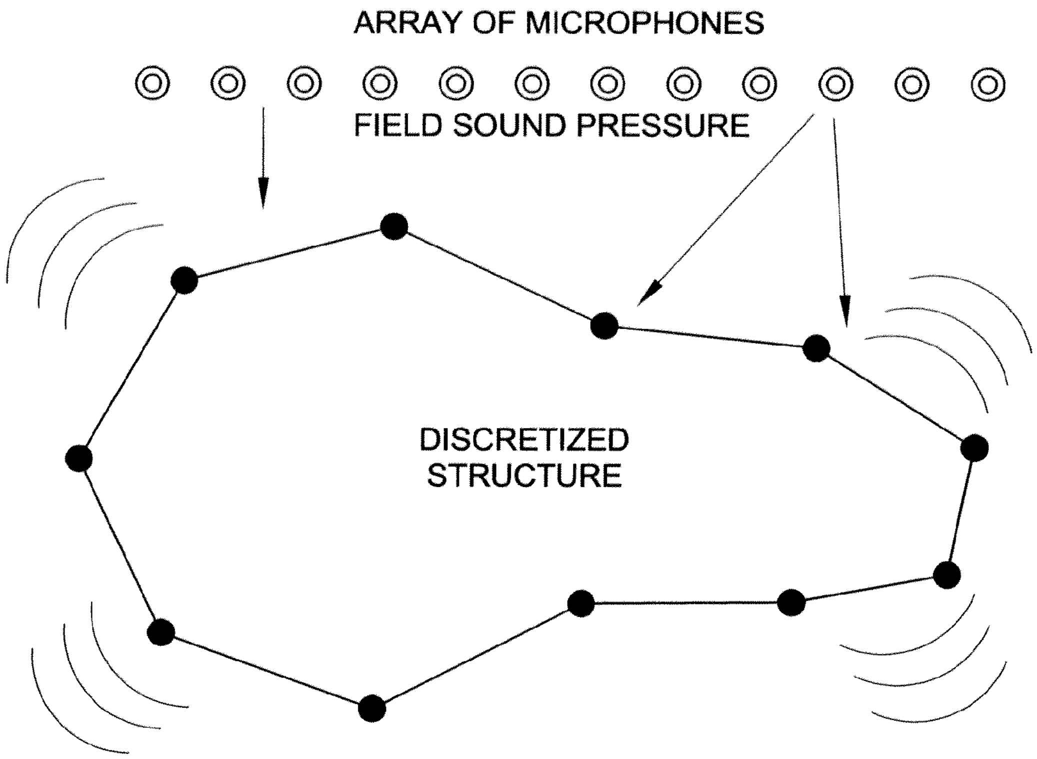
FIG. 3 illustrates inverse numerical acoustics.

Inverse numerical acoustics is an engineering process that aims at deriving the normal velocities on a source (e.g., the horn) from a measured sound field around the source. With reference to FIG. 3, a diagram of inverse numerical acoustics is illustrated. The diagram includes a discretized structure having vibrating surfaces and an array of microphones measuring the sound pressure caused by the vibrating surfaces of the discretized structure. These measurements are used to derive the normal surface velocities on the discretized structure.

Figure 4:
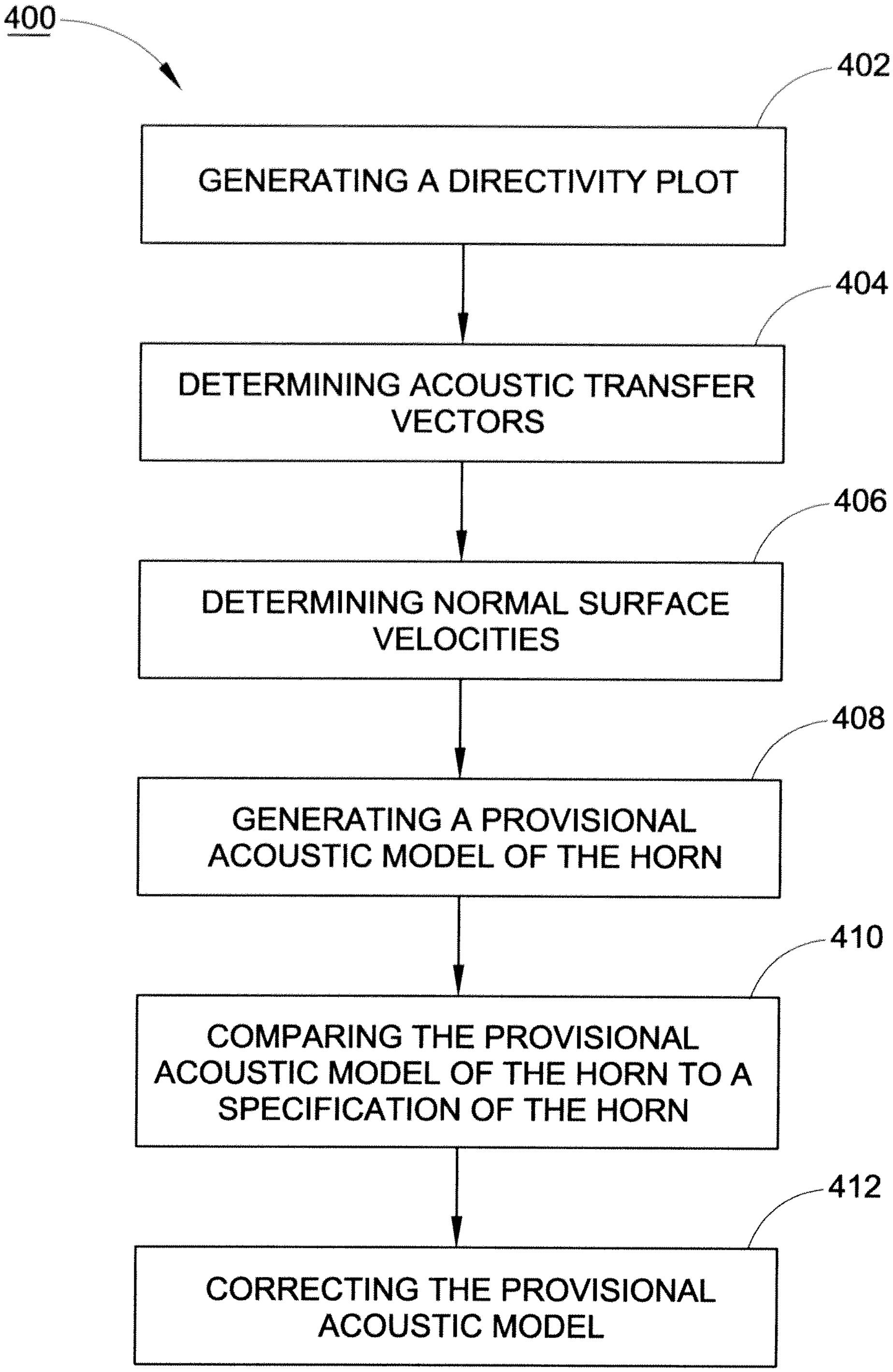
FIG. 4 illustrates a method for generating an acoustic model of the horn using inverse numerical acoustics.

With reference to FIG. 4, a method 400 for generating an acoustic model of the horn using inverse numerical acoustics is illustrated. The method 400 includes generating a directivity plot using near-field pressure measurements (Action 402), determining Acoustic Transfer Vectors (Action 404), determining normal surface velocities using the directivity plot and the Acoustic Transfer Vectors (Action 406), generating a provisional acoustic model of the horn using boundary element methods (Action 408), comparing the provisional acoustic model of the horn to a horn specification (Action 410), and correcting the provisional acoustic model to bring it in line with the horn specification (Action 412).

Figure 5:
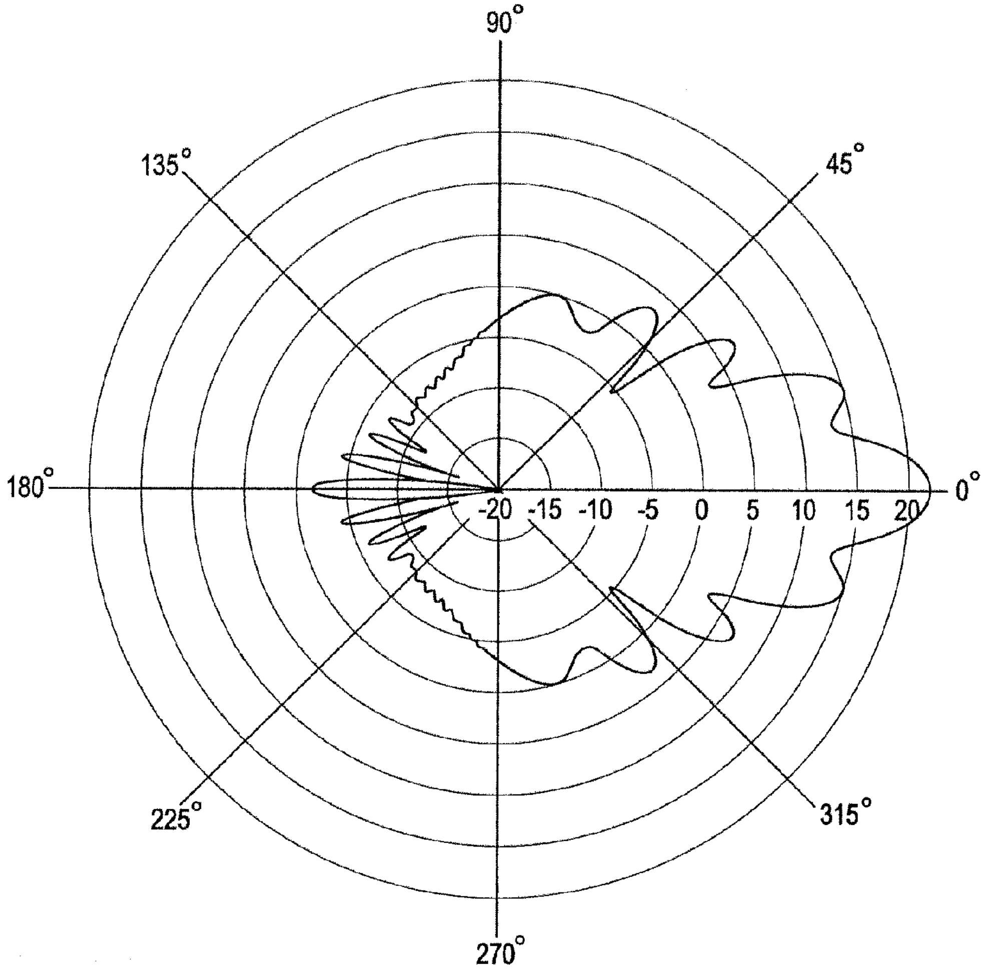
FIG. 5 (PRIOR ART)
FIG. 5 illustrates a portion of a directivity plot.

More particularly, a directivity plot of the horn is generated (Action 402) which corresponds to a plot of the sound field around the horn. In other words, the directivity plot plots the sound pressure around the horn in 3-dimensions. The directivity plot, however, does not need to encompass the entirety of the horn. For example, sound pressure measurements may be taken only at the mouth of the horn. The directivity plot is also frequency dependent, such that the directivity plot is tied to a particular frequency. With reference to FIG. 5, a portion of a directivity plot along the xz-plane is illustrated.

Figure 6:
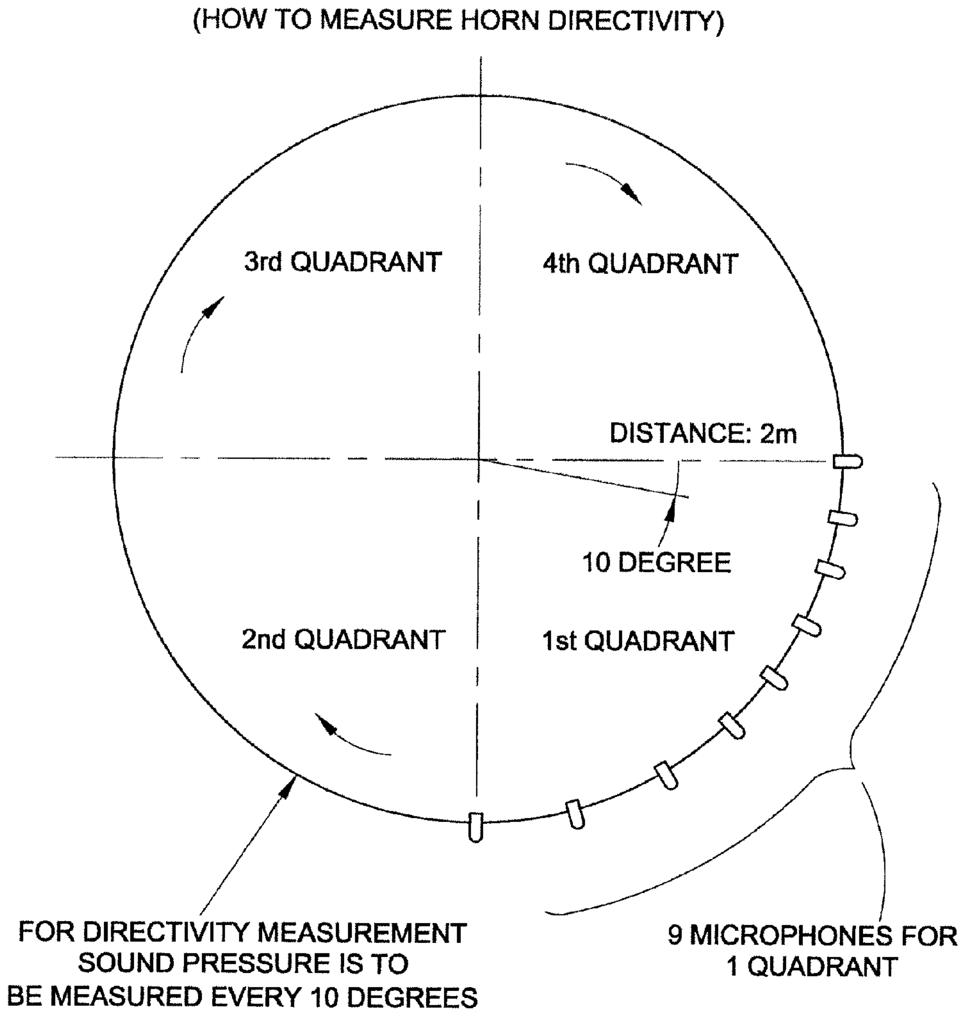
FIG. 6 (PRIOR ART)
FIG. 6 illustrates a partially populated microphone array for generating a directivity plot.

To generate a directivity plot an array of microphones is used to make near-field pressure measurements. The near field is the area closer to the horn than one or two wavelengths of the frequency to be used. For example, if 3400 Hz is the frequency used for generating the directivity plot, the near field would be within 10-20 centimeters of the horn. With reference to FIG. 6, a partially populated microphone array for carrying out this task is illustrated. As can be seen, the microphone array measures the sound pressure at known positions relative to the horn. By moving this microphone array incrementally in the xy-plane, xz-plane, and yz-plane the directivity plot can be easily generated in 3-dimensions.

Figure 7:
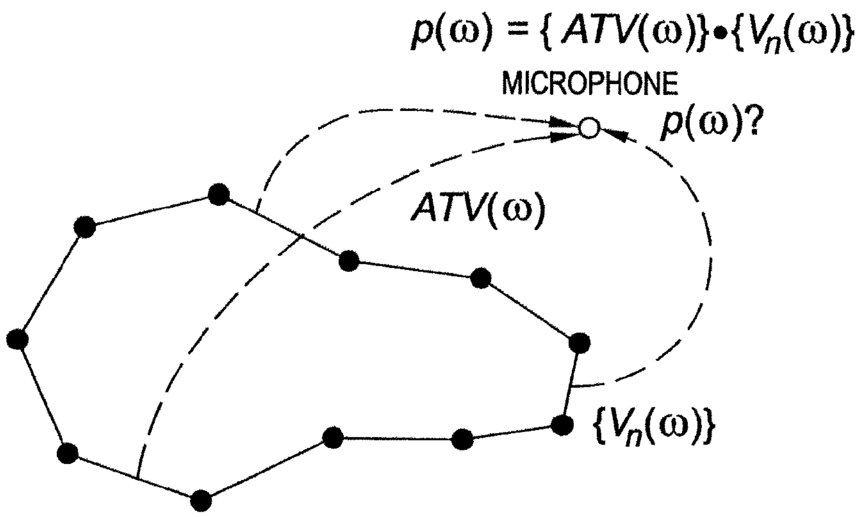
FIG. 7 (PRIOR ART)
FIG. 7 illustrates an Acoustic Transfer Vector.

Referring again to FIG. 4, once the directivity plot for the horn is determined (Action 402), Acoustic Transfer Vectors (ATVs) are determined (Action 404). ATVs are input-output relations between the normal velocity of a vibrating surface and the sound pressure level at a specific field point. The vibrating surface corresponds to the surface of the horn and the specific field point corresponds to one of the points measured when generating the directivity plot. ATVs depend on the configuration of the acoustic domain (i.e., the shape of the vibrating body and the fluid properties controlling the sound propagation), the acoustic surface treatment, the frequency and the field point. ATVs are not required to depend on the loading condition. With reference to FIG. 7, the concept of an ATV is illustrated.

To build the Acoustic Transfer Vectors, traditional methods known to those skilled in the art may be employed. However, as described herein, the improved method of generating Acoustic Transfer Vectors disclosed in Cremers et al. (U.S. Pat. No. 6,985,836) is employed. As will be seen, Cremers et al. uses the reciprocity principle to generate Acoustic Transfer Vectors.

Four numerical formulations are typically available for solving Acoustic Transfer Vectors: a direct boundary element formulation, a multi-domain boundary element formulation, an indirect boundary element formulation, and an acoustic finite/infinite element formulation. These formulations rely upon discretization of the geometrical domain (i.e., the horn), or of its boundary, and solve a wave equation in the frequency domain. Herein, the wave equation to be used is the is the Helmholtz wave equation:

$$\nabla^2 p + k^2 p = -j\rho_0\omega q \tag{1}$$

where $$k = \frac{\omega}{c} = \frac{2\pi f}{c}$$

is the wave number of acoustic waves at frequency ω. It is to be appreciated, however, that other wave equations are equally amenable to the teachings herein.

Using the direct boundary element formulation, the acoustic pressure at any point of a homogeneous fluid domain containing no acoustic source can be expressed in terms of the acoustic pressure on the boundary domain and its normal derivative:

$$p(\vec{x}) = \int_S p(\vec{y})\frac{\partial G(\vec{x}\,|\,\vec{y})}{\partial n_y}dS_y - \int_S \frac{\partial p(\vec{y})}{\partial n_y}G(\vec{x}\,|\,\vec{y})dS_y \tag{2}$$

where $p(\vec{y})$ is the acoustic pressure on the boundary and $$\frac{\partial p(\vec{y})}{\partial n_y}$$

its normal derivative, $\vec{n}_y$ is the inward normal at point $\vec{y}$ on the boundary and $G(\vec{x}\,|\,\vec{y})$ is the Green's function. Making use of the Euler equation, equation (2) becomes:

$$p(\vec{x}) = \int_S p(\vec{y})\frac{\partial G(\vec{x}\,|\,\vec{y})}{\partial n_y}dS_y + j\rho\omega\int_S v(\vec{y})G(\vec{x}\,|\,\vec{y})dS_y \tag{3}$$

where $v(\vec{y})$ is the normal acoustic velocity on the boundary, ρ is the fluid mass density and ω is the angular frequency.

Note that the boundary acoustic velocity is related to the structural velocity through the following relationship:

$$v(\vec{y})=v_s(\vec{y})+\beta(\vec{y})p(\vec{y}) \tag{4}$$

where $v_s(\vec{y})$ is the structural velocity and $\beta(\vec{y})$ the boundary admittance. Using equation (4), equation (3) becomes $$p(\vec{x}) = \int_S p(\vec{y})\frac{\partial G(\vec{x}\mid\vec{y})}{\partial n_y}dS_y + j\rho\omega\int_S \beta(\vec{y})p(\vec{y})G(\vec{x}\mid\vec{y})dS_y + j\rho\omega\int_S v_s(\vec{y})G(x\mid y)dS_y \tag{5}$$

This equation is true in the domain and on its boundary. Nevertheless, when evaluated on the boundary, the Green's function and its normal derivative become singular. Whereas the last two integrals of equation (5) are regular, the first one is singular and should be evaluated in the Cauchy's principal value sense:

$$c(\vec{x})p(\vec{x}) = P.V.\int_S p(\vec{y})\frac{\partial G(\vec{x}\mid\vec{y})}{\partial n_y}dS_y + j\rho\omega\int_S \beta(\vec{y})p(\vec{y})G(\vec{x}\mid\vec{y})dS_y + j\rho\omega\int_S v_s(\vec{y})G(x\mid y)dS_y \text{ where} \tag{6}$$

$$c(\vec{x}) = 1 + P.V.\int_S \frac{1}{4\pi|\vec{x}-\vec{y}|}\frac{\partial|\vec{x}-\vec{y}|}{\partial n_y} \tag{7}$$

in the three dimensional space. Note that $$c(\vec{x}) = \frac{1}{2}$$

for a smooth surface around $\vec{x}$.

Once discretized using boundary elements and evaluated at the mesh nodes, equation (6) leads to the following matrix system:

$$[A]\{p_b\}=[B]\{v_b\} \tag{8}$$

where the subscript b stands for boundary. Similarly, equation (5) gives:

$$p=\{d\}^T\{P_b\}+\{m\}^T\{v_b\} \tag{9}$$

Combining equations (8) and (9) leads to:

$$p=\{\text{atv}\}^T\{v_b\} \tag{10}$$

where {atv} is the Acoustic Transfer Vector, given by:

$$\{\text{atv}\}^T=\{d\}^T[A]^{-1}[B]+\{m\}^T \tag{11}$$

The Acoustic Transfer Vector (ATV) is therefore an array of transfer functions between the surface normal velocity and the pressure at the field point. Finally, when the pressure is evaluated at several locations, equation (10) can be rewritten as:

$$\{p\}=[\text{ATM}]^T\{v_b\} \tag{12}$$

where the Acoustic Transfer Matrix [ATM] is formed by the different Acoustic Transfer Vectors.

In cases where the acoustic region includes partitions characterized with different fluid material properties, the above formulation cannot be directly used since it is only valid for homogeneous domains. In such cases, a multi-domain direct boundary element formulation may be used. According to this formulation, the global acoustic region is decomposed into sub-domains with the requirement that, within a sub-domain, the fluid properties need to be homogeneous. At the interface between the sub-domains, continuity conditions are enforced.

For sake of simplicity, consider here a two-domain model. Equation (8) for the first sub-domain can be written as:

$$\begin{bmatrix} A_1^{ii} & A_1^{ij} \\ A_1^{ji} & A_1^{jj} \end{bmatrix}\begin{Bmatrix} p_1^i \\ p_1^j \end{Bmatrix} = \begin{bmatrix} B_1^{ii} & B_1^{ij} \\ B_1^{ji} & B_1^{jj} \end{bmatrix}\begin{Bmatrix} v_1^i \\ v_1^j \end{Bmatrix} \tag{13}$$

where superscript i stands for internal degrees of freedom and superscript j stands for interface degrees of freedom. Similarly, equation (8) can be rewritten for the second sub-domain as:

$$\begin{bmatrix} A_2^{ii} & A_2^{ij} \\ A_2^{ji} & A_2^{jj} \end{bmatrix}\begin{Bmatrix} p_2^i \\ p_2^j \end{Bmatrix} = \begin{bmatrix} B_2^{ii} & B_2^{ij} \\ B_2^{ji} & B_2^{jj} \end{bmatrix}\begin{Bmatrix} v_2^i \\ v_2^j \end{Bmatrix} \tag{14}$$

The continuity of the normal velocity and acoustic pressure has to be satisfied at the interface between of the two sub-domains:

$$\begin{cases} v_1^j = -v_2^j = v^j \\ p_1^j = p_2^j = p^j \end{cases} \tag{15}$$

Combining equations (13), (14) and (15) leads to the global system of equations:

$$\begin{bmatrix} A_1^{ii} & A_1^{ij} & -B_1^{ij} & 0 \\ A_1^{ji} & A_1^{jj} & -B_1^{jj} & 0 \\ 0 & A_2^{ij} & B_2^{ij} & A_2^{ii} \\ 0 & A_2^{jj} & B_2^{jj} & A_2^{ji} \end{bmatrix}\begin{Bmatrix} p_1^i \\ p^j \\ v^j \\ p_2^i \end{Bmatrix} = \begin{bmatrix} B_1^{ii} & 0 \\ B_1^{ji} & 0 \\ 0 & B_2^{ii} \\ 0 & B_2^{ji} \end{bmatrix}\begin{Bmatrix} v_1^i \\ v_2^i \end{Bmatrix} \tag{16}$$

Using equation (16), one can define the Acoustic Transfer Vectors for the global system:

$$p = \{atv\}^T\begin{Bmatrix} v_1^i \\ v_2^i \end{Bmatrix} \tag{17}$$

and similarly derive the Acoustic Transfer Matrix [ATM] when the acoustic pressure has to be evaluated at different locations.

Neither a direct boundary element formulation nor a multi-domain direct boundary element formulation may be employed to model a homogeneous domain where both sides of the boundary radiate. However, an indirect boundary element formulation is suited for such use in that it can be used to model an interior domain, an exterior domain, or both simultaneously.

Beyond the direct boundary element formulation and the multi-domain direct boundary element formulation, an indirect boundary element formulation may be employed. Using an indirect boundary element formulation, the acoustic pressure at any point of the domain can be expressed in terms of single and double layer potentials.

$$p(\vec{x}) = \int_S \mu(\vec{y}) \frac{\partial G(\vec{x}\mid\vec{y})}{\partial n_y} dS_y - \int_S \sigma(\vec{y}) G(\vec{x}\mid\vec{y}) dS_y \tag{18}$$

where $\sigma(\vec{y})$ and $\mu(\vec{y})$ are the single and double layer potentials, respectively (i.e., velocity jump and pressure jump, respectively).

For the Neuman problem (i.e., structural velocity boundary condition) and when both sides of the boundary have the same velocity (i.e., thin shell), this equation can be expressed only in terms of double layer potentials:

$$p(\vec{x}) = \int_S \mu(\vec{y}) \frac{\partial G(\vec{x}\mid\vec{y})}{\partial n_y} dS_y \tag{19}$$

This simplified equation can then be evaluated on an arbitrary surface S' and derived with respect to the normal at $x \in S'$ pre-multipled by an admissible test function $\delta\mu(x)$ and integrated over the surface S':

$$\int_{S'} \frac{\partial p(\vec{x})}{\partial n_x} \delta\mu(\vec{x}) dS' = \int_{S'} \int_S \mu(\vec{y}) \frac{\partial^2 G(\vec{x}\mid\vec{y})}{\partial n_x \partial n_y} \delta\mu(\vec{x}) dS_y dS'_x \tag{20}$$

Letting the surface S' tend to surface S and using the Euler equation, the preceding equation can be rewritten as:

$$-\int_S jwpv(\vec{x})\delta\mu(\vec{x}) dS = \int_S \int_S \mu(\vec{y}) \frac{\partial^2 G(\vec{x}\mid\vec{y})}{\partial n_x \partial n_y} \delta\mu(\vec{x}) dS_y dS_x \tag{21}$$

After discretizing using boundary elements, equation (19) becomes:

$$p=(d)^d\{u\} \tag{22}$$

Similarly, equation (21) becomes:

$$[Q]\{u\}=[H]\{v_b\} \tag{23}$$

Combining equations (22) and (23):

$$p=\{\text{atv}\}^T\{v_b\} \tag{24}$$

where {atv} is an Acoustic Transfer Vector given by:

$$\{\text{atv}\}^T=\{d\}^T[Q]^{-1}[H] \tag{25}$$

When the acoustic pressure is evaluated at several locations, equation (24) can be rewritten as:

$$\{p\}=[\text{ATM}]^T\{v_b\} \tag{26}$$

where the acoustic transfer matrix [ATM] is formed by the different Acoustic Transfer Vectors.

In addition to the boundary element formulations discussed above, a finite/infinite element formulation may be employed. The solution of the Helmholtz equation based on a finite/infinite element approach leads to a system of linear equations:

$$([K]+j\rho\omega[D]-\omega^2[M])\{p\}=-j\rho\omega\{F\} \tag{27}$$

where K is the fluid stiffness matrix, D is the fluid damping matrix, M is the fluid mass matrix and F is the forcing vector, defined by:

$$\{F\}=[C]\{v_b\} \tag{28}$$

where C is a coupling matrix.

Combining equations (27) and (28):

$$\{p\}=[\text{ATM}]^T\{v_b\} \tag{29}$$

where the Acoustic Transfer Matrix [ATM] is given by:

$$[ATM]^T = \frac{-j\rho\omega[C]}{([K]+j\rho\omega[D]-\omega^2[M])} \tag{30}$$

Finally, for each finite element grid point, the acoustic pressure can be written as:

$$p=\{\text{atv}\}^T\{v_b\} \tag{31}$$

where {atv} is the Acoustic Transfer Vector, given by the corresponding row of the [ATM] matrix.

Building on the foregoing numerical formulations, Acoustic Transfer Vectors can be computed using the reciprocity principle. As shown in equations (11), (16), (25) and (30), the evaluation of any field point related ATV requires the inversion of a matrix, whose order is approximately equal to the number of nodes of the discretized geometry (mesh).

The numerical evaluation of the inverse of an order n matrix is performed by solving a system of linear equations, whose right-hand-side is built from the unity matrix, leading typically to one matrix factorization, and n back-substitution steps.

$$[A][X]=[I] \tag{32}$$

For large matrix orders, the computational effort and time required for performing the n back-substitution steps is very significantly larger than the factorization time.

Looking to equation (11), it can be deduced that an ATV is a vector for which each coordinate corresponds to the pressure at the corresponding field point due to a unit excitation (vibrating velocity) at one point/element on the surface, and no excitation elsewhere.

$$atv_i = \{atv\}\begin{Bmatrix} 0 \\ \vdots \\ 1 \\ \vdots \\ 0 \end{Bmatrix} \tag{33}$$

According to the reciprocity principle, the pressure response at a first location due to an excitation at a second location is strictly equal to the pressure response at the second location due to the same excitation at the first location. Therefore, if a source of strength $Q_1$ at position 1 causes a pressure $p_2$ at position 2, and if a source of strength $Q_2$ at position 2 causes a pressure $p_1$ at position 1, resulting in the following relationship:

$$p_1Q_1=p_2Q_2 \tag{34}$$

Using the reciprocity principle to evaluate the ATV related to a specific field point means that a monopole source (point source) of strength $Q_1$ should be positioned at the field point location 1, and the pressure is calculated on the boundary $p_2$.

Equation (12) shows how the ATV will be exploited to convert the boundary surface velocity (representing vibrations) into the field point acoustic pressure. Since a structure may be complex, containing T-junctions and other discontinuities, surface vibrations are better defined on surfaces, i.e. on finite elements, rather than at grid points (where the normal directly is not always uniquely defined). Therefore, it is required to define element-based Acoustic Transfer Vectors.

In the case where the source placed on the boundary (in 2) is distributed over a small surface, equation (34) may be rewritten as:

$$p_1Q_1=\int_S p_2 v_2 dS \quad (35)$$

where $v_2$ is the source velocity. In the particular case where the source is distributed over a single element, the pressure at any point on the surface can be approximated as:

$$p_2=\langle p_2\rangle\{N\} \quad (36)$$

where $\{N\}$ is the interpolation function and $\langle p_2\rangle$ is the pressure evaluated at the element nodes. Similarly the source velocity can be approximated as:

$$v_2=\langle N\rangle\{v_2\} \quad (37)$$

where $\{v_2\}$ is the source velocity at the element nodes. Equations (35) to (37) lead to the following relation:

$$p_1Q_1=\langle p_2\rangle[C_e]\{v_2\} \quad (38)$$

where $[C_e]$ is the element coupling matrix defined as:

$$[C_e]\int_{S_e}=\{N\}\langle N\rangle dS \quad (39)$$

For a monopole source, the source strength is given by:

$$Q_1=\frac{4\pi}{j\rho\omega}A \quad (40)$$

where A is the monopole source amplitude. Combining (38) and (40):

$$p_1=\frac{j\rho\omega}{4\pi A}\langle p_2\rangle[C_e]\{v_2\} \quad (41)$$

which can be rewritten as:

$$p_1=[ATV_e]\{v_2\} \quad (42)$$

where $[ATV_e]$ is the element-based Acoustic Transfer Vector, computed by:

$$[ATV_e]=\frac{j\rho\omega}{4\pi A}\langle p_2\rangle[C_e] \quad (43)$$

Applying at the field point a monopole source with a unit amplitude A=1 and $\omega=2\pi f$, the following expression for evaluating the element-based Acoustic Transfer Vector is obtained:

$$[ATV_e]=\frac{j\rho f}{2}\langle p_2\rangle[C_e] \quad (44)$$

showing that the ATV related to a given field point can then be computed from the boundary sound pressure values, correctly scaled.

To summarize Cremers et al., Acoustic Transfer Vectors are determined using the reciprocity principle. This includes the following: simulating positioning of a monopole, omnidirectional wave energy source at a reference position remote from a body; computing a boundary oscillation amplitude of the wave generated by the source at a surface of the body; and deriving from the boundary oscillation amplitude the Acoustic Transfer Vector.

The approach of Cremers et al. can be used in conjunction with the directivity plot to determine Acoustic Transfer Vectors for the measured field points. As noted above, a field point corresponds to one of the points measured when generating the directivity plot. In certain embodiments, horn specification data may also be used in conjunction with the approach depending on what type of data is used from the directivity plot. For example, instead of using the sound pressure measurements made as part of the directivity plot, the horn specification may be used.

Referring back to FIG. 4, after the ATVs are determined (Action 404), they can be used in conjunction with the pressure measurements taken when constructing the directivity plot to determine the normal surface velocities (Action 406). Namely, using equation (10), the normal velocities of the horn are determined by rewriting equation (10) as follows:

$$\{v_b\}=[ATM]^{-1}\{p\} \quad (45)$$

where $\{p\}$ corresponds to the pressure measurements taken when constructing the directivity plot.

There is, however, a further obstacle to overcome. Namely, the inversion of the acoustic transfer matrix is not obvious, because the matrix is generally not square but rectangular and because it involves a Fredholm equation (of the first kind for the indirect approach and of the second kind for the direct approach) and is ill conditioned. Therefore the matrix inversion is preferably performed using the singular value decomposition (SVD) technique, which allows the solution of singular or close to singular systems. It is considered that any n×m complex matrix can be written as:

$$[ATM]=[V][\sigma][U]^H, \quad (46)$$

where the superscript H stands for 'transpose complex conjugate', $\sigma$ is a diagonal min(n,m)×min(n,m) real matrix, [U] is a m×min(n,m) complex matrix and [V] is a n×min (n,m) complex matrix. The coefficients of $[\sigma]$, called singular values, are stored in an decreasing order and matrices [U] and [V] are such that:

$$[V]^H[V]=[U]^H[U]=[I] \quad (47)$$

Nevertheless, singular or ill-conditioned matrices contain null or small singular values. This results in infinite or very large values in $[\sigma]^{-1}$. Whereas the infinite terms clearly lead to an infinite solution, the very large values lead to a solution of equation (11) that will be very sensitive to the right hand side variations. Therefore, small errors on the right hand side will result in very large errors in the solution. To avoid this problem, the small or null terms of $[\sigma]$ are set to zero in $[\sigma]^{-1}$. This process is called truncated singular value decomposition. The singular values are set to zero as soon as $\sigma_i<\alpha\sigma_1$ where $\alpha$ is a tolerance parameter.

After determining the normal velocities on the surface of the horn (Action 406), a provisional acoustic model of the horn can be generated (Action 408). The acoustic model of the horn can be determined using boundary element methods to derive a system of linear equations solving the Helmholtz wave equation for the horn. These linear equations are derived by simplifying the boundary integral equation for the horn, where the normal velocities previously determined are used as the boundary condition. Indirect boundary element methods are suitably used due to the open nature of a horn. For more information, attention is directed to Stephen M. Kirkup, The Boundary Element Method in Acoustics (1998).

The provisional acoustic model previously generated in Action 408 can then be compared against the horn specification (Action 410). Moreover, a simulation is run using the provisional acoustic model of the horn to predict the sound pressure and/or sound pressure level of the horn at one or more points specified by the horn specification. The horn specification might, for example, recite 108+5, −2.5 dB at 1 meter from the mouth of the horn. If the prediction closely approximates the specification of the horn, the acoustic model of the horn is deemed to be acceptable. If the prediction shows a disparity exceeding a predetermined amount, the provisional acoustic model is corrected to correlate with the horn specification (Action 412). One reason the horn model might not meet the specifications could be due to a failure to account for harmonic frequencies. However, this can be easily remedied by including additional frequency content in the horn model.

At least two methods of correcting the acoustic model of the horn may be employed. The first method of correcting the acoustic model of the horn involves increasing the sample size of the directivity plot. Naturally, taking such action increases the quality of the acoustic model of the horn, but does so at the expense of increased computation time. The second method of correcting the acoustic model is to apply a correction factor. For example, a correction factor might address disparities between the acoustic model and the horn specification by multiplying predictions by the acoustic model by a factor of two.

Figure 8:
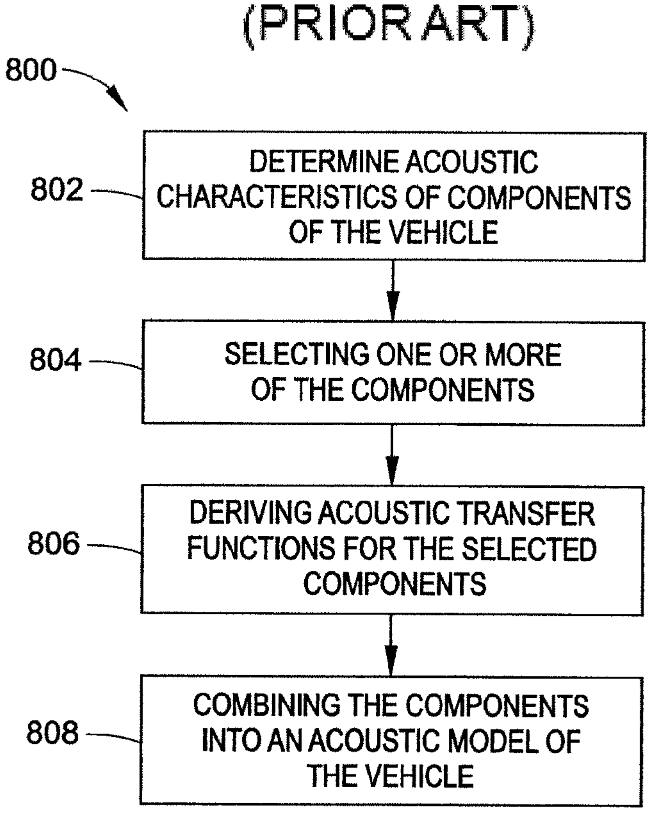
FIG. 8 illustrates a method for generating an acoustic model of a vehicle.

Referring back to FIG. 2, after the acoustic model of the horn is generated (Action 202), the acoustic model of the vehicle can be generated (Action 204). The vehicle model, similar to the horn model, uses boundary element methods. With reference to FIG. 8, a method 800 for generating an acoustic model of a vehicle is illustrated. The method 800 includes determining acoustic characteristics of components making up the vehicle (Action 802), selecting one or more of the components (Action 804), deriving acoustic transfer functions for the selected components (Action 806), and combining the components of the vehicle into an acoustic model of the vehicle (Action 808).

To begin, acoustic characteristics of components making the vehicle are determined (Action 802). The acoustic characteristics of a component can be determined on the basis of the components acoustic transmissibility and material absorption properties. In certain embodiments, such properties are determined through at least one of impedance tube tests, characterizing components with general transfer functions $H(s)=Y(s)/X(s)$, and supplier data. However, in addition to the previously enumerated methods of determining acoustic characteristics of a component, other methods are equally amenable.

After the acoustic characteristics of a component are determined (Action 802), one or more of the components are selected (Action 804). Selection is accomplished, at least partially, through consideration of contribution level. Contribution level refers to the level to which a component will contribute to the sound pressure level at a target point relative to the vehicle. Components having high sound absorption properties have a high contribution level and components having low sound absorption properties (or highly reflective properties) have a low contribution level.

In selecting components, only components having contributions exceeding a threshold are selected. Initially, this threshold is set so only components having high contribution levels are selected. Advantageously, this saves computational time since only the most relevant components are considered. However, as will be seen, the vehicle model may undergo what essentially amounts to calibration, whereby additional components may be selected. This is accomplished by lowering the threshold for selection. Components having no contribution (i.e., purely reflective components) will never be selected.

Having selected components (Action 804), acoustic transfer functions are determined for the selected components (Action 806). A transfer function is the relationship of input over output $H(s)=Y(s)/X(s)$. The acoustic transfer function for a component is obtained by generalizing an acoustic transfer function obtained through testing and analysis of the component. Put another way, a numerical approximation of an acoustic transfer function obtained through testing and analysis is used as the acoustic transfer function of a component.

Once the transfer functions for the selected components are determined (Action 806), all the components of the vehicle are combined into an acoustic model of the vehicle (Action 808). The model includes a virtual representation of the vehicle taking into account the relative locations of all the components, whereby, in many regards, it can be analogized to a virtual vehicle in a computer game. Therein, those components lacking acoustic transfer functions are treated as purely reflective and those components having acoustic transfers are assigned their respective transfer functions.

Components having acoustic transfer functions are where much of the computational effort of the acoustic model lies since they affect sound propagation through the vehicle model. When one of these components is excited with acoustic energy, the transfer function for the component allows the determination of the component's response to the acoustic energy. This response, in turn, corresponds to the pressure on the surface of the component, which can then be used as the boundary condition for boundary elements methods.

Referring back to FIG. 2, once the vehicle model is determined (Action 204), the acoustic model of the horn and the acoustic model of the vehicle are combined into a complete acoustic model (Action 206). The complete acoustic model is the acoustic model of the vehicle having the acoustic model of the horn disposed therein, where the horn is placed within the acoustic model of the vehicle according to a desired horn layout. As will be seen, the horn acts as input to the acoustic model of the vehicle. In certain embodiments, the complete acoustic model may also include a correction factor (static or variable) for adjusting in response to external variables, such as wind, temperature and humidity.

After creating the complete acoustic model (Action 206), the complete acoustic model generated can be used to predict sound pressure level at one or more points relative to the vehicle (Action 208). In accomplishing this, the acoustic model of the horn is used as input into the vehicle model such that the acoustic model of the horn is used to excite surrounding components. A combination of direct and indirect boundary integral equations are then solved as sound propagates outwards from the acoustic model of the horn through the acoustic model of the vehicle. Direct boundary integral equations are used when a component has a continuous boundary (or surface), whereas indirect boundary integral equations are used when a component (e.g., the horn) has a discontinuous boundary (or surface). The solution to the Helmholtz equation at a point can then be determined by summing the sound pressure due to all reflections and incident waves.

To illustrate, sound propagates out from the horn according to the directivity plot discussed above and components it comes in contact with. The sound pressure at these components can be obtained through the use of boundary element methods since the locations of the surrounding components relative to the horn are known by virtue of the complete acoustic model. Accordingly, determining the sound pressure caused by the horn at each of these components is simply a matter of solving an exterior boundary problem.

Once components are excited by sound, they begin vibrating and giving off sound. The sound given off by components having transfer functions is determined by the transfer functions of the components. Namely, the transfer functions allow the determination of surface pressure in response to an excitation pressure, whereby the boundary conditions for the components are known. These components then act in much the same way as the horn to give off sound which can excite other components. Further, similar to the horn, the sound pressure at these other components can be determined using boundary element methods. The sound given off by components lacking transfer functions is simply the same as what was used to excite the components since they are treated as purely reflective.

Figure 9:
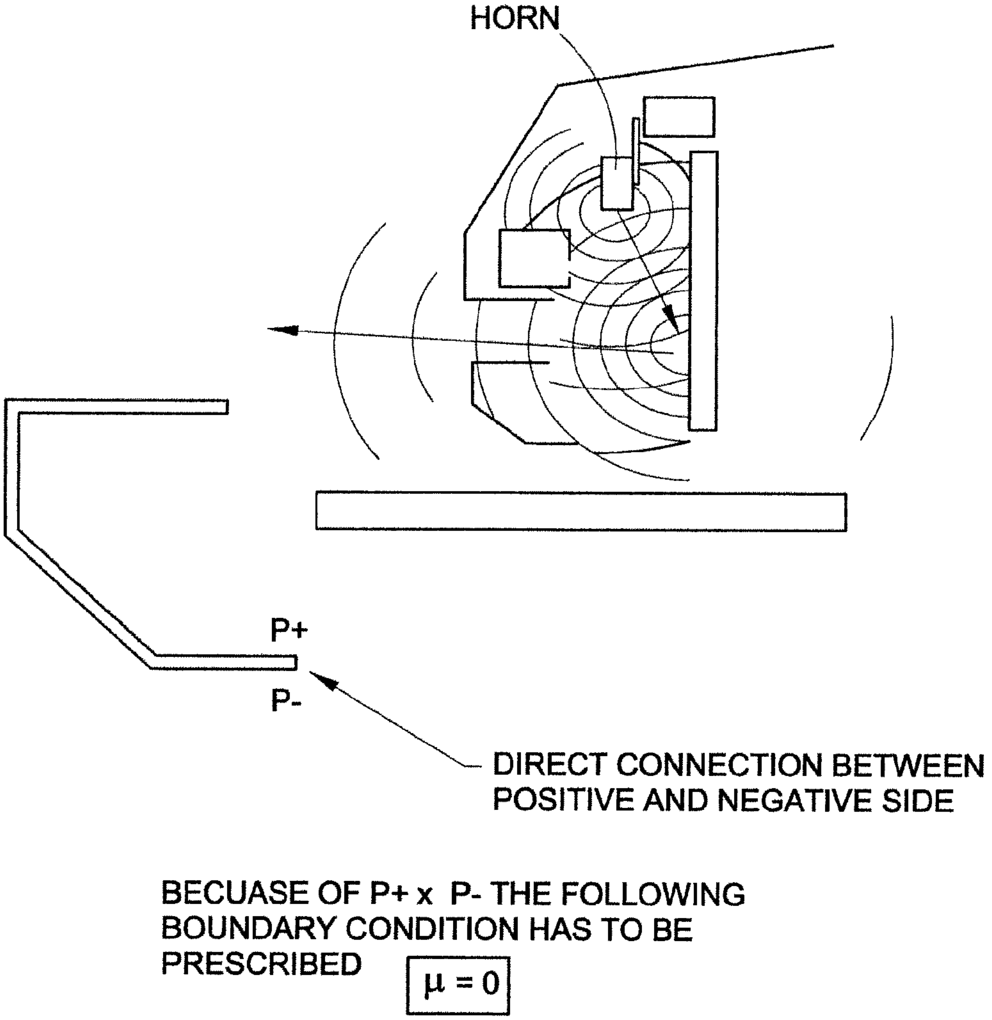
FIG. 9 (PRIOR ART)
FIG. 9 illustrates sound propagation through a vehicle.

Conducting an outward propagation of sound towards a target point, as noted above, the sound pressure at the target point will then be the sum of sound pressure from all the components. With reference to FIG. 9, sound propagation through a vehicle is graphically illustrated. As can be seen, sound begins propagating outward from the horn, and, as the sound comes in contact with a component, sound is absorbed and/or reflected. Eventually, the sound makes it out of the vehicle.

Once Action 208 is completed, the method 200 may conclude. Namely, as noted above in connection with Action 208, the complete model can be used to make predictions of the sound pressure level at points relative to the vehicle. However, in certain embodiments, it may be desirable to calibrate the complete acoustic model using actual measurements from the vehicle. Under these embodiments, the method 200 may proceed to carryout Actions 210 through 214.

Assuming it desirable to calibrate the complete acoustic model, sound pressure level at the one or more points used in Action 208 is measured (Action 210). In other words, the actual vehicle being modeled is used to generate sound pressure measurements. As will be seen, these measurements allow the validity of the predictions of Action 208 to be checked. In certain embodiments, these measurements are made on a test setup similar to FIG. 1, where microphones measure the sound pressure level and/or sound pressure caused by the horn of the vehicle at regulation distances from the vehicle.

After actual measurements are taken (Action 210), the predicted sound pressure level is compared with the measured sound pressure to determine the accuracy of the acoustic models (Action 210). If the results sufficiently match (i.e., the difference between the measurements and the predictions is within a predetermined amount), the acoustic model is ready for use and does not need any modification. Otherwise, however, the complete acoustic model is in need of correction (Action 214). In certain embodiments, the accuracy of the model is called into question if the predictions made by the model are off by +/−3 dB.

In order to correct the complete acoustic model, the acoustic model of the vehicle is refined to include the transfer functions of additional components. Namely, the threshold for selection of a component is lowered and the acoustic model of the vehicle is regenerated according to the method of FIG. 8. In certain embodiments, the threshold is adjusted incrementally each time the complete acoustic model is run through simulations and fails to achieve accurate results. After correcting the acoustic model, Actions 206 through 214 are repeated.

It should also be appreciated, that the foregoing addresses a single frequency. The method of FIG. 2 will preferably be undertaken for each frequency under review. An ideal frequency range to consider is 20 to 20 kHz. However, there is a tradeoff between computation time and accuracy. Accordingly, a frequency range of 300 to 600 Hz is suitable for use herein because this is the region where the fundamental frequency of the horn generally lies per specification.

Figure 10:
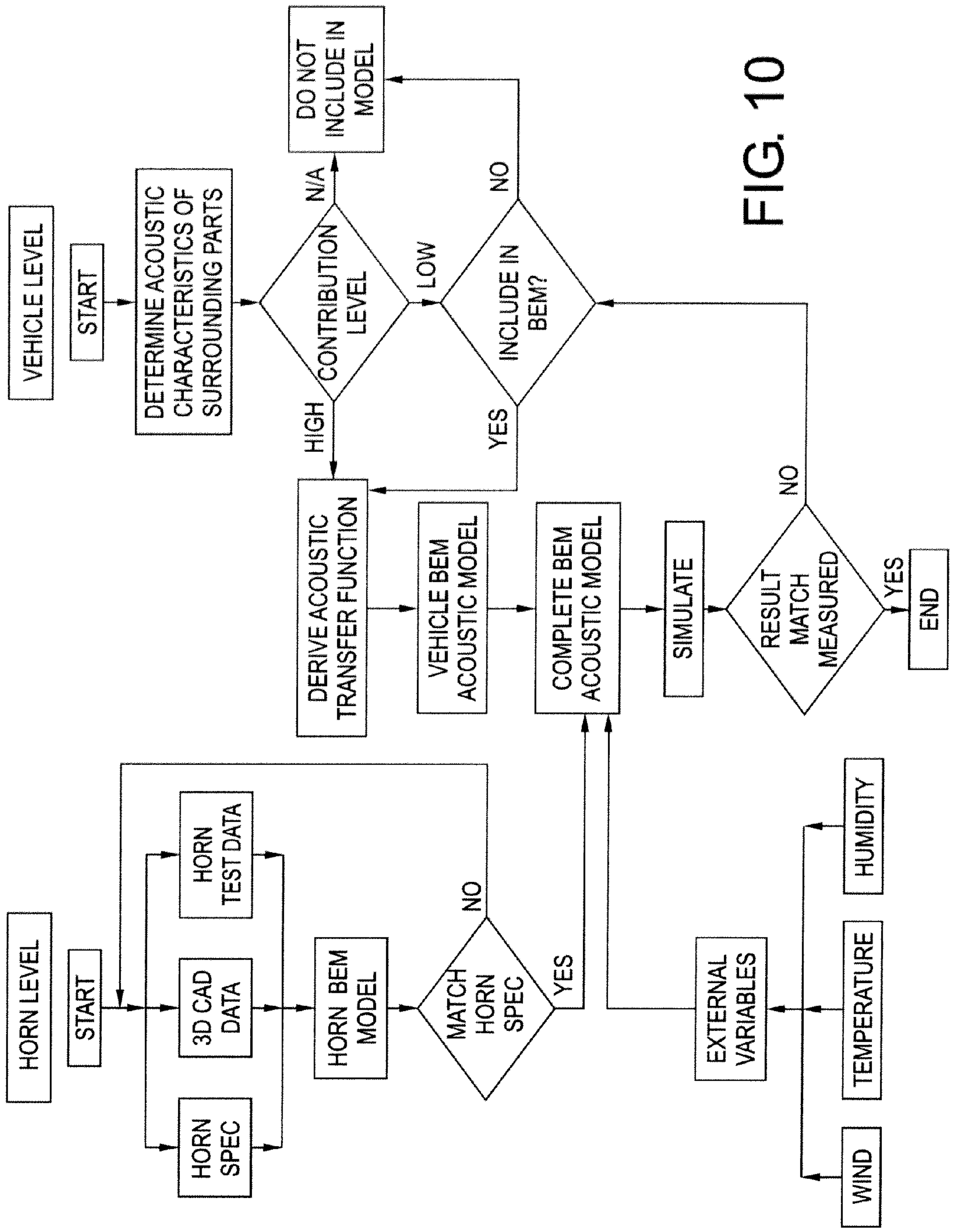
FIG. 10 illustrates an expanded view of the method of FIG. 2.

With reference to FIG. 10, an expanded view of the method of FIG. 2 is illustrated. As can be seen, an acoustic model of the horn is generated and an acoustic model of the vehicle is generated. The acoustic model of the horn is generated as discussed in connection with FIG. 4 and the acoustic model of the vehicle is generated as discussed in connection with FIG. 8. Once those models are generated, they are combined into a complete acoustic model that takes into account external variables. The complete acoustic model is then tested and modified as necessary depending upon how accurately it matches actual measurements. In other words, the completed acoustic model undergoes what was described as calibration above.

Figure 11:
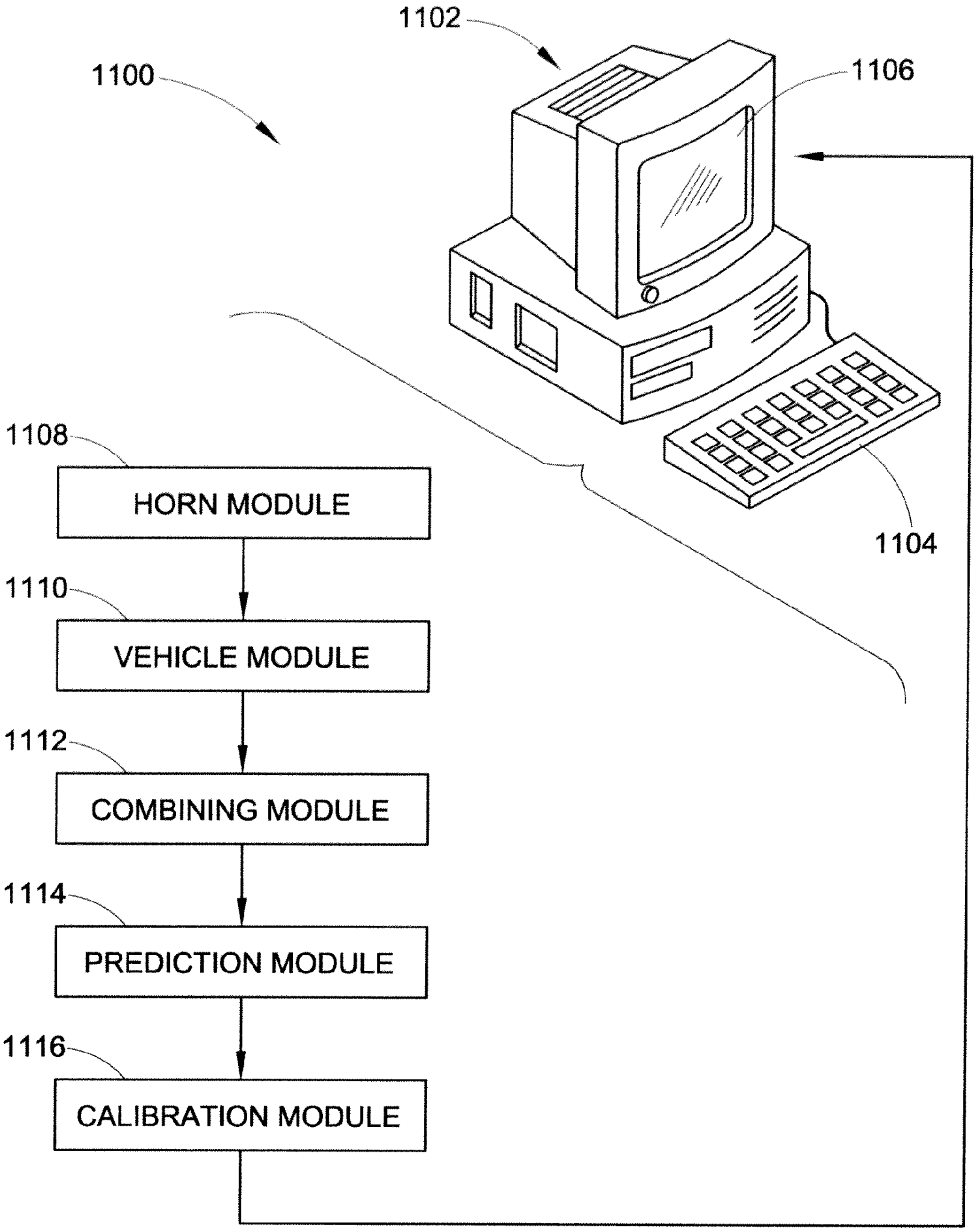
FIG. 11 illustrates a system employing the method of FIG. 2.

With reference to FIG. 11, a system employing the method of FIG. 2 is illustrated. Suitably, a computer 1102 or other digital processing device, including storage and a digital processor, such as a microprocessor, microcontroller, graphic processing unit (GPU), etc., embody the system 1100. In other embodiments, the system 1100 is embodied by a server including a digital processor and including or having access to digital data storage, such server being suitably accessed via the Internet or a local area network, or by a personal data assistant (PDA) including a digital processor and digital data storage, or so forth.

The computer 1102 or other digital processing device suitably includes or is operatively connected with one or more user input devices such as an illustrated keyboard 1104 for receiving user input to control the system 1100, and further includes or is operatively connected with one or more display devices such as an illustrated display 1106 for displaying output generated based on the output of the system 1100. In other embodiments, the input for controlling the system 1100 is received from another program running previously to or concurrently with the system 1100 on the computer 1102, or from a network connection, or so forth. Similarly, in other embodiments the output may serve as input to another program running subsequent to or concurrently with the system 1100 on the computer, or may be transmitted via a network connection, or so forth.

The system 1100 includes a horn module 1108, a vehicle module 1110, a combining module 1112, a prediction module 1114, and, optionally, a calibration module 1116. During operation, the horn module receives at least one of a horn specification, 3-dimensional cad data, and test data which it uses to generate an acoustic model of the horn in accordance with Action 202 of FIG. 2. After the horn module 1108 generates the acoustic model of the horn, the vehicle module 1110 generates an acoustic model of the vehicle in accordance with Action 204 of FIG. 2. The acoustic models from the horn module 1108 and the vehicle module 1110 are then passed to the combining module 1112 which combines said models into a complete acoustic model in accordance with Action 206 of FIG. 2. The prediction module 1114 then uses the complete acoustic model generated by the combining module 1112 to make a prediction of sound pressure level at one or more points in accordance with Action 208 of FIG. 2. The one or more user input devices of the computer 1102 suitably provide the one or more points.

Optionally, once predictions at the one or more points are made, the calibration module 1116 calibrates the complete acoustic model. The calibration module 1116 seeks to refine the complete acoustic module based up sound pressure level measurements at the one or more points. Accordingly, the calibration module 1116 acts in accordance with Actions 210 through 214 of FIG. 2.

In view of the discussion heretofore, in some embodiments, the exemplary methods, the systems employing the same, and so forth, of the present invention are embodied by a storage medium storing instructions executable (for example, by a digital processor) to implement the determination of image anchor templates. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Further, it will be appreciated that various of the above-disclosed features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for predicting a sound pressure level caused by a horn disposed within a vehicle, said method comprising using a computer processor to:

generate an acoustic model of the horn using inverse numerical acoustics and boundary element methods;

generate an acoustic model of the vehicle using boundary element methods, wherein said generating the acoustic model of the vehicle comprises:

determining acoustic characteristics of components forming the vehicle;

selecting one or more of the components based upon the determined acoustic characteristics, wherein said selecting the one or more of the components includes selecting only components having high contribution levels, wherein contribution level is determined from acoustic characteristics;

deriving acoustic transfer functions for the selected components; and, combining the components into the acoustic model of the vehicle;

combining the acoustic model of the horn and the acoustic model of the vehicle into a complete acoustic model; and, predicting sound pressure level at one or more points relative to the vehicle using the complete acoustic model.

2. The method according to claim 1, further comprising:

measuring sound pressure level at the one or more points;

comparing the predicted sound pressure level at the one or more points to the measured sound pressure level at the one or more points;

correcting the complete acoustic model if a difference between the predicted sound pressure level and the measured sound pressure level is greater than a predetermined amount.

3. The method of claim 2, wherein said correcting the complete acoustic model includes regenerating the acoustic model of the vehicle to include transfer functions for additional components.

4. The method of claim 1, wherein said generating the acoustic model of the horn comprises:

generating a directivity plot of the horn using near-field pressure measurements at one or more field points;

determining normal surface velocities of the horn using inverse numerical acoustics and the near-field pressure measurements;

generating a provisional acoustic model of the horn using boundary element methods, the directivity plot and the normal surface velocities;

comparing the provisional acoustic model of the horn to a specification of the horn; and, correcting the provisional acoustic model of the horn if a difference between the acoustic model of the horn and the specification exceeds a threshold.

5. The method of claim 4, wherein the determining the normal surface velocities includes determining Acoustic Transfer Vectors for the one or more field points.

6. The method of claim 5, wherein the Acoustic Transfer Vectors are determined using an indirect boundary element method formulation.

7. The method of claim 4, wherein said generating the provisional acoustic model of the horn uses the normal surface velocities as boundary conditions.

8. The method of claim 4, wherein said generating the provisional acoustic model of the horn uses indirect boundary element method.

9. The method of claim 4, wherein said correcting the provisional acoustic model of the horn includes regenerating the acoustic model of the horn using more field points than the one or more field points.

10. The method of claim 4, wherein said correcting the provisional acoustic model of the horn includes applying a correction factor to the acoustic model of the horn.

11. The method of claim 1, wherein the acoustic transfer functions for the selected components establish said boundary conditions for the selected components.

12. The method of claim 1, wherein the combining the components includes designating components other than the selected components as purely reflective.

13. The method of claim 1, wherein the complete acoustic model includes a correction factor for environmental conditions.

14. The method according to claim 1, further including:

combining the acoustic model of the horn and the acoustic model of the vehicle into a complete acoustic model according to a horn layout of the vehicle; and, predicting sound pressure level at one or more points relative to the vehicle using the complete acoustic model to test compliance of the horn layout with sound pressure level regulations.

15. A system for predicting a sound pressure level caused by a horn disposed within a vehicle, comprising:

at least one processor programmed to:

generate an acoustic model of the horn using inverse numerical acoustics and boundary element methods;

generate an acoustic model of the vehicle using boundary element methods by:

determining acoustic characteristics of components forming the vehicle;

selecting one or more of the components based upon the determined acoustic characteristics, wherein said selecting the one or more of the components includes selecting only components having high contribution levels, wherein contribution level is determined from acoustic characteristics;

deriving acoustic transfer functions for the selected components; and, combining the components into the acoustic model of the vehicle;

combine the acoustic model of the horn and the acoustic model of the vehicle into a complete acoustic model according to a horn layout of the vehicle; and, predict sound pressure level at one or more points relative to the vehicle using the complete acoustic model to test compliance of the horn layout with sound pressure level regulations.

16. The system of claim 15, wherein the at least one processor is further programmed to:

correct the complete acoustic model if a difference between predicted sound pressure levels and measured sound pressure levels is greater than a predetermined amount.

17. The system of claim 15, wherein the at least one processor is programmed to generate the acoustic model of the horn by:

generating a directivity plot of the horn using near-field pressure measurements at one or more field points;

determining normal surface velocities of the horn using inverse numerical acoustics and the near-field pressure measurements;

generating a provisional acoustic model of the horn using boundary element methods, the directivity plot and the normal surface velocities;

comparing the provisional acoustic model of the horn to a specification of the horn; and, correcting the provisional acoustic model of the horn if a difference between the acoustic model of the horn and the specification exceeds a threshold.

18. The system of claim 15, wherein the at least one processor is programmed to generate the acoustic model of the vehicle by:

determining acoustic characteristics of components forming the vehicle;

selecting one or more of the components based upon the determined acoustic characteristics;

deriving acoustic transfer functions for the selected components; and, combining the components into the acoustic model of the vehicle.

19. A method for determining whether a horn layout of a horn within a vehicle meets sound pressure level regulations, said method comprising:

generating, using a computer processor, an acoustic model of the horn using inverse numerical acoustics and boundary element methods;

generating, using a computer processor, an acoustic model of the vehicle using boundary element methods;

combining, using a computer processor, the acoustic model of the horn and the acoustic model of the vehicle into a complete acoustic model according to the horn layout;

predicting, using a computer processor, sound pressure level at one or more points specified by sound pressure level regulations using the complete acoustic model;

comparing the predicted sound pressure level to sound pressure level regulations;

wherein the acoustic model of the vehicle is generated by:

determining acoustic characteristics of components forming the vehicle;

selecting one or more of the components based upon the determined acoustic characteristics, wherein said selecting the one or more of the components includes selecting only components having high contribution levels, wherein contribution level is determined from acoustic characteristics;

deriving acoustic transfer functions for the selected components; and, combining the components into the acoustic model of the vehicle.

* * * * *